United States Patent [19] [11] Patent Number: 4,776,906
Bernard [45] Date of Patent: * Oct. 11, 1988

[54] REPAIR METHOD FOR DRYWALLS AND LIKE CONSTRUCTION MATERIALS

[76] Inventor: Andre Bernard, P.O. Box 276, Mt. Kisco, N.Y. 10549

[*] Notice: The portion of the term of this patent subsequent to Dec. 30, 2003 has been disclaimed.

[21] Appl. No.: 946,979

[22] Filed: Dec. 29, 1986

[51] Int. Cl.⁴ .................. B32B 31/26; B32B 35/00
[52] U.S. Cl. .................. 156/85; 52/514; 156/94; 156/256; 156/280; 264/36; 264/230; 264/342 R; 264/DIG. 71; 427/140; 427/171; 428/63; 428/910; 428/913
[58] Field of Search .................. 156/85, 94, 98, 280; 264/36, 230, 342 R, DIG. 7; 428/63, 910, 913; 52/514; 427/140, 171, 372.2

[56] References Cited
U.S. PATENT DOCUMENTS 3,483,965 12/1969 Rosenblatt et al. ............ 156/85 X
4,122,222 10/1978 Parker ............ 156/94 X
4,247,509 1/1981 Talbot ............ 264/230
4,358,495 11/1982 Parker ............ 156/94 X
4,460,420 7/1984 Estrada ............ 428/63 X
4,471,594 9/1984 Doyle ............ 264/36 X
4,632,790 12/1986 Bernard ............ 264/36

Primary Examiner—Robert A. Dawson
Attorney, Agent, or Firm—Myron Amer

[57] ABSTRACT

A method is provided for masking a crack in a drywall or plaster surface of a dwelling, comprising the steps of die cutting a repair patch from a heat-shrinkable plastic film of a defined size presenting a surface area adapted to be placed in covering relation over the crack and bounded about its periphery by surrounding edges. The patch is prepared with an adhesive confined to the surrounding edges only and is placed over the crack making an initial attachment to the drywall and heat is applied to the patch, to cause a contraction in size of the patch while exerting a pressure normal in size in the patch.

2 Claims, 1 Drawing Sheet

REPAIR METHOD FOR DRYWALLS AND LIKE CONSTRUCTION MATERIALS

BACKGROUND OF THE INVENTION

The present invention relates to improvements in the method of making repairs to plaster and/or drywall board walls and ceilings.

In my copending application Ser. No. 722,840, issued as U.S. Pat. No. 4,632,790, Dec. 30, 1986 there is disclosed an inventive method for the repair of plaster, gypsum wallboard panels and the like used in the construction of walls and ceilings in private dwellings, office buildings and the like.

The disclosed method employs a high temperature-resistant, shrinkable film with a thickness from 20 to 100 mu which had been stretched during manufacture monoaxially and/or biaxially, at temperatures just below the solidification point of the polymer at a stretching ratio of between 1.1 to 3.0. This film is applied as a patch, over a crack and open joint in the plaster and wallboard and thereafter air heated while being so held. The film patch shrinks under the influence of temperatures above the stretching temperature, in proportions according to the stretching ratio. In the range of the shrink-producing temperatures the film becomes tacky and adhesive where it is in contact with the wall resulting in adhesion of the film to the contacted surface of the plaster and gypsum wall, while the film portion over the crack, and thus not in contact with any surface, shrinks and thus is devoid of any wrinkles.

Also, and most important, if inadvertently a force is applied against the repair patch area that is over the crack and creates a depression or wrinkles therein which extends into the void of the crack, it is a significant part of the present invention that external heat can again be applied to the patch and that responsive thereto the patch area covering the crack will again shrink and in this way again become devoid of the inadvertently caused depression or wrinkles.

In applying the repair patch it is necessary to initially tack the film patch to the wall surface, so that a close contact between the film and the wall surface exists prior to the application of heat. To effect this temporary attachment, strips of adhesive tape or masking tape is applied topically to the film and over its edges in contact with the film to the wall surface. It was also disclosed that one face of the film could be provided with a layer of an adhesive to be pressed against the wall surface. The result of the disclosed method is a completed covering providing a crack-free and virtual edgeless patch, that is a significant advance over the prior art methods for repair of surface cracks, edge and joints using spackling compound and the like.

It is the object of the present invention to provide an improvement over the aforementioned method in which the disadvantages enumerated above are overcome, and also to provide a repair patch that even after its initial application can be caused to have a smooth, non-detectable surface.

According to method aspects of the present invention, an improved method is provided for masking a crack in a drywall or plaster surface of a dwelling, comprising the steps of die cutting a repair patch from a heat shrinkable plastic film of a defined size presenting a surface area adapted to be placed in covering relation over the crack and bounded about its periphery by surrounding edges. The repair patch is manufactured with an adhesive confined to the surrounding edges only, and is placed over the crack to make an initial attachment to the drywall and heat is applied to the patch. The heat causes a contraction in size of the patch while exerting a pressure normal to the patch. This totally removes all wrinkles therefrom and the patch firmly attaches itself to the surface effectively masking from view the crack in the surface.

In a second embodiment, the heat shrinkable plastic is provided in strip form in a supply roll or the like. A selected length is adapted to be cut therefrom to serve as a repair patch. The plastic strip is provided with a previously applied adhesive confined to edges along opposite longitudinal sides of said plastic strip.

The above brief description, as well as further objects, features and advantages of the present invention will be more fully appreciated by reference to the following detailed description of the within inventive method and repair patch in conjunction with the accompanying drawing describing said method and patch wherein.

Figure 1:
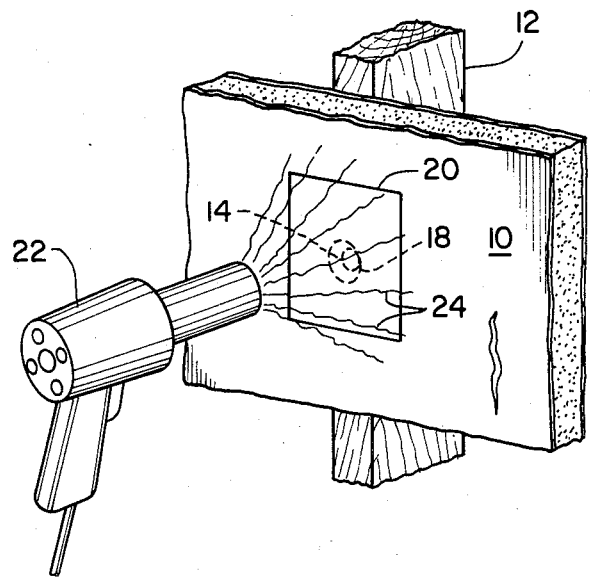
FIG. 1 illustrates the application of a plastic film, formed in accordance with the present invention, in covering relationship over a defect such as a crack.

The manner of applying the heat-shrinkable film will be readily understood from FIG. 1 in which a wallboard or gypsum board panel 10, which has been attached to the vertical stud 12, is shown with the inevitable resulting surface depression 14 in its surface, created by the penetration of a nail 18 into the stud. The depression 14 is repaired by replacing thereover a film 20 of heat-shrinkable plastic material. The film 20 is appropriately sized to completely cover the depression 14 and is positioned in covering relationship over the depression 14. In this initial condition, the plastic film 20 of course, might not effectively mask the presence of the depression 14 because there might remain surface wrinkles and because the unheated patch does not establish a firm enough attachment to the surface of the wall. A conventional hot air blower 22 is employed to provide a hot air stream 24 which impinges against the external face of the film 20, preferably in a direction normal thereto. As understood, the temperature of the hot air stream 24 of a typical hair dryer 22 is in the range of between 115 degrees to 148 degrees C causing a shrinkage and contraction in the film 20 without causing the film 20 to reach its kindling temperature. In general, the aforementioned method follows the procedure set out in my copending application now U.S. Pat. No. 4,632,790, the contents of which are incorporated herein as if more fully set forth.

Figure 2:
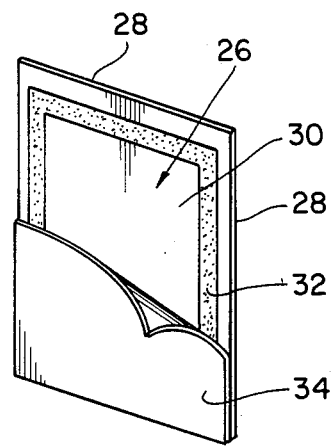
FIG. 2 is an isometric view of a roll of material from which the improved patch of the present invention can be formed.
Figure 3:
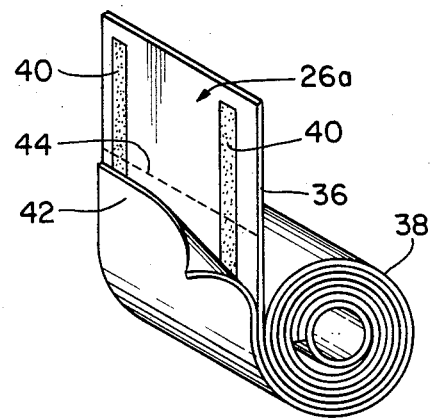
FIG. 3 is another embodiment of a patch formed in accordance with the present invention.

The improved method employs patches of heat shrinkable film as illustrated in FIGS. 2 and 3. In FIG. 2 the film is individually cut preferably during manufacture by die cutting patches 26 of a selected shape and size bounded by edges 28 in spaced clearance positions in surrounding relationship to the surface area 30. A small line of adhesive 32 is applied along the peripheral edges 28, perferably during manufacture. A dry adhesive of the type sold by Rohn and Hass, Philadelphia, is preferred, and is covered with a peal-away tape 34 so that a packet of patches may be supplied by the user, ready for use. In FIG. 3 the heat shrinkable film material is supplied as a strip 36 having a selected width and for all intents and purposes indefinite, endless length. The strip 36 is conveniently shipped as a roll 38 or in a folded condition (not shown). Preferably, the width of the strip 36 is such that it can effectively cover most joints and cracks without any difficulty. In this embodiment, a thin line of adhesive material 40, of the type earlier mentioned is placed along each of its opposed longitudinal edges, and covered with a removable backing 42. By cutting the strip to size along a traverse line 44, a suitable sized patch 26a is removed. If desired, the strip may be pre-scored to facilitate removal of the patch.

In accordance with the present invention it is contemplated that the adhesive employed here is such that it provides a strong bond with the wall surface to which it is applied, so that when either patch 26 or 26a are placed on the wall surface, a permanent adhesion perpendicular to the wall surface is obtained, so that the patch need not be otherwise held to the wall during the application of heat.

The impinging hot air stream 24 from the blower 22 heats the patch 26 (or 26a) so that it shrinks. It also heats the film coextensive with the adhesive so that this film portion becomes tacky and adhesive and as a result of the air stream being impinged thereon in a direction normal to the wall. This film area contributes to the attachment made to the surface of the wall. As a result, the patch manifests a wrinkle-free fully adhered appearance on its surface and masks from view the surface impression 18. Because the film from which the patches 26,26a are formed is extremely thin, virtually no edge is detected, and as a final step, an application of a coat of paint may be applied to the patch thus even hiding the patch itself.

If subsequently an external force is applied against the patch area over the crack causing a depression extending into the crack, the patch can be heated through the covering layer of paint and in practice it has been found that this heat will produce further shrinkage in the patch and remove the depression, again returning the patch to a smooth condition in which it cannot be readily detected.

It will, of course, be readily appreciated that the patches of the present invention function in the same manner as the film disclosed in our aforementioned patent. In other respects, as well, a latitude of modifications, changes and substitutions is intended. For example, although rectangular patches have been shown, certainly oval and circular patches can be employed in the same manner.

Accordingly, it is appropriate that the appended claims be construed broadly and in a manner consistent with the spirit and scope of the invention herein.

What is claimed is:

1. For masking a crack in a drywall and plaster surface of a dwelling, a repair method using heat shrinkable plastic film, said method comprising the steps of die cutting a repair patch from said heat shrinkable plastic of a size presenting a surface are adapted to be placed in covering relation over said crack and bounded by edges in spaced clearance positions in surrounding relation about said surface area, applying adhesive to said plastic repair patch confined to said edges and on the face thereof adapted to cover said crack placing said repair patch over said crack and making an initial adhesive attachment to said drywall and plastic surface using said adhesive, applying heat to said patch while exerting a pressure normal thereto so as to cause a contraction in size in said patch while exerting a pressure normal thereto so as to cause a contraction in size in said patch which totally removes all wrinkles therefrom simultaneously with said pressure maintaining said contact between said patch and said surface, whereby said patch firmly attaches itself to said surface while manifesting therein a wrinkle-free appearance to thereby effectively mask from view said crack in said surface, applying a layer of the wall color of paint over said repair patch, and thereafter again applying heat to subsequently further shrink said patch in said operative position thereof and again cause the removal of wrinkles therein should it be necessary to do so.

2. For masking a crack in a drywall and plaster surface of a dwelling using a repair patch die cut to size from a supply roll of heat shrinkable plastic in strip form a selected length presenting a surface area adapted to be placed in covering relation over said crack and having previously applied adhesive confined to edges along opposite sides of said plastci strip, said repair patch being placed over said crack and making an initial adhesive attachment to said drywall and plastic surface using said adhesive, and having had heat applied to said patch while exerting a pressure normal thereto so as to cause a contraction in size in said patch while exerting a pressure normal thereto so as to cause a contraction in size in said patch which totally removes all wrinkles therefrom simultaneously with said pressure maintaining said contact between said patch and said surface, whereby said patch firmly attaches itself to said surface while manifesting therein a wrinkle-free appearance to thereby effectively mask from view said crack in said surface, an improved method of using said repair patch comprising the steps of applying a layer of the wall color of paint over said repair patch, and thereafter applying heat subsequently shrink said patch in said operative position thereof and cause the removal of wrinkles therein should it be necessary to do so.

* * * * *